June 23, 1931.  H. GOLDHAGEN  1,811,046
EMERGENCY PIPE CUTTER
Filed April 17, 1930
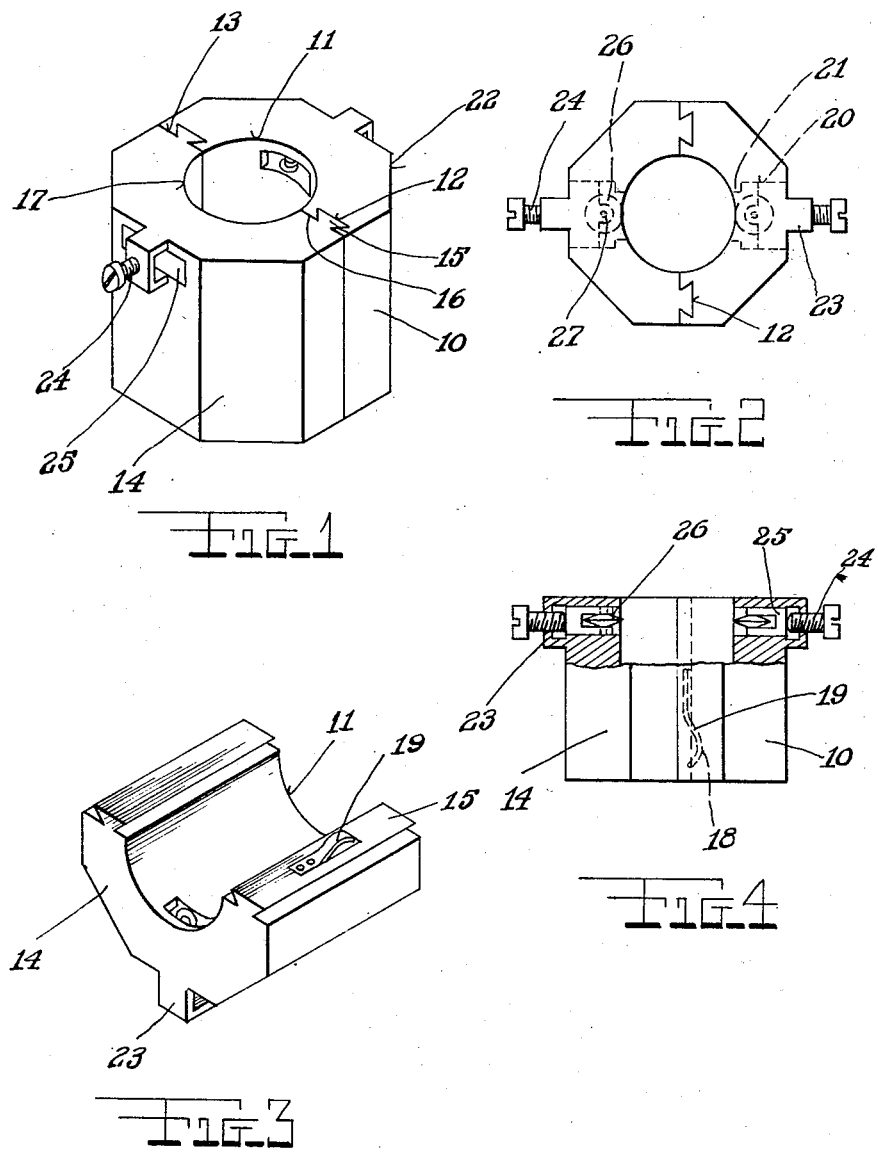
Inventor
H. Goldhagen
By his Attorney J. Ledermann Patented June 23, 1931

1,811,046

UNITED STATES PATENT OFFICE

HARRY GOLDHAGEN, OF NEW YORK, N. Y.

EMERGENCY PIPE CUTTER

Application filed April 17, 1930. Serial No. 444,911.

The main object of this invention is to provide a divided pipe cutter which is adapted to be used in confined areas for the purpose of dividing a pipe at positions where pipes are already installed in locations such as corners of dwellings or the like.

Another object of the invention is to provide a pipe cutter formed of two members, one interlocking the other, having shearing discs thereon which are adapted to shear a pipe upon which the cutter is secured.

The above and other objects will become apparent in the description below in which characters of reference refer to like-named parts in the drawings.

Referring briefly to the drawings, Figure 1 is a perspective view of the pipe cutter showing the two members in coupled condition.

Figure 2 is a top plan view of Figure 1.

Figure 3 is a perspective view of one of the complemental pipe cutting members.

Figure 4 is a fragmentary sectional front elevational view of the pipe cutter showing the pipe cutting mechanism therein.

Referring in detail to the drawings, the numeral 10 indicates one of the pipe cutting units. This unit is provided with a semicircular channel 11 which passes longitudinally therethrough. Dovetailed passage ways 12 are formed upon the seats 13 of this member.

A complemental body unit 14 is provided with ridges 15 dovetailed in outline upon the seat 16 on which rests the opposing body member 10. The complemental body member 14 is provided with a semi-circular longitudinal channel 17. The channels 11 and 17 of the complemental bodies of the pipe cutter form a circular aperture which passes entirely through the interlocked bodies and is adapted to receive a pipe of any dimension with the limits of the size of the aperture. One of the faces 13 formed on the body 10 is provided with a curved recess 18 in which registers the free projecting end of a resilient finger 19. Said finger being adapted to lock the body members 10 and 14 to each other in proper aligned condition. Body members 10 and 14 are each provided with rectangular recesses 20 which have shoulders 21 at their lower ends. These recesses 20 pass diametrically through the walls of the bodies 10 and 14 and open upon one of a plurality of symmetrical faces 22 which are adapted to be engaged by an open end or Stillson wrench. A block like bridge 23 is permanently secured to the face of the body members 10 and 14 in which the recesses 20 are formed. The bridges 23 have screws 24 passing therethrough which adjustably move blocks 25 into the recesses 20 so that the cutting discs 26, rotatably mounted between the ears 27, forming part of the blocks, may be projected into the confines of the aperture formed by the semi-circular channels 11 and 17.

This device is adapted to serve as an emergency pipe cutter and is particularly to be used under conditions where the mechanic operating the device does not have ample space to use the ordinary type of pipe cutter in such confined areas, as the corners of dwellings or the like. Where pipes are in confined spaces, the complemental bodies are secured about a pipe which is to be replaced by a new section. The one body 10 is first permitted to girdle one half of the pipe. The complemental body 14 is then slipped about the other half of the pipe below or above body 10 and the dovetailed ridges 15 are then slid into the complemental passage ways 12 until the resilient finger 19 registers in the recess 18, after which the bodies are in matched position. By rotating the adjusting screws 24, the blocks 25 are lowered into the recesses 20, thereby projecting the periphery of the cutting discs 26 into effective range within the aperture formed by semi-circular channels 11 and 17. This adjustment or projection of the blocks is continued by rotating the adjusting screws until the pipe section which is to be removed is secured from the remainder of the pipe.

It is to be noted that certain changes in form and construction may be made without departing from the spirit and scope of the invention.

I claim:

1. In a pipe cutter, a pair of complemental bodies, discs in said bodies, means for projecting said discs into cutting relation with a pipe, dovetailed ridges on one of said bodies, dovetailed passage ways on the complemental body and means on said ridges for latching said complemental bodies in matched position.

2. In a pipe cutter, a pair of complemental bodies, discs in said bodies, means for projecting said discs into cutting relation with a pipe, dovetailed ridges on one of said bodies, dovetailed passage ways on the complemental body, one of said bodies having a recess therein and means adapted to engage in said recess for retaining said complemental bodies in matched position.

3. In a pipe cutter, a pair of complemental bodies, discs in said bodies, means for projecting said discs into cutting relation with a pipe, dovetailed ridges on one of said bodies, dovetailed passage ways on the complemental body, one of said bodies having a recess therein, a resilient tongue mounted on one body co-operating and registering in said recess to match said interlocked bodies.

4. In a pipe cutter, a pair of complemental bodies, discs slidable in said bodies, dovetailed ridges on one of said bodies, dovetailed passage ways on the complemental body, one of said bodies having a recess therein, an upwardly curved resilient finger mounted on one body co-operating and registering in said recess to match said interlocked bodies, said complemental bodies having recesses therein and means slidable in said recesses having said discs mounted thereon for moving said discs into cutting position, said bodies having semi-circular channels passing therethrough forming a pipe aperture between said bodies and screws engaging said blocks for projecting said cutting discs into said apertures.

In testimony whereof I affix my signature.

HARRY GOLDHAGEN.